Figure 1:
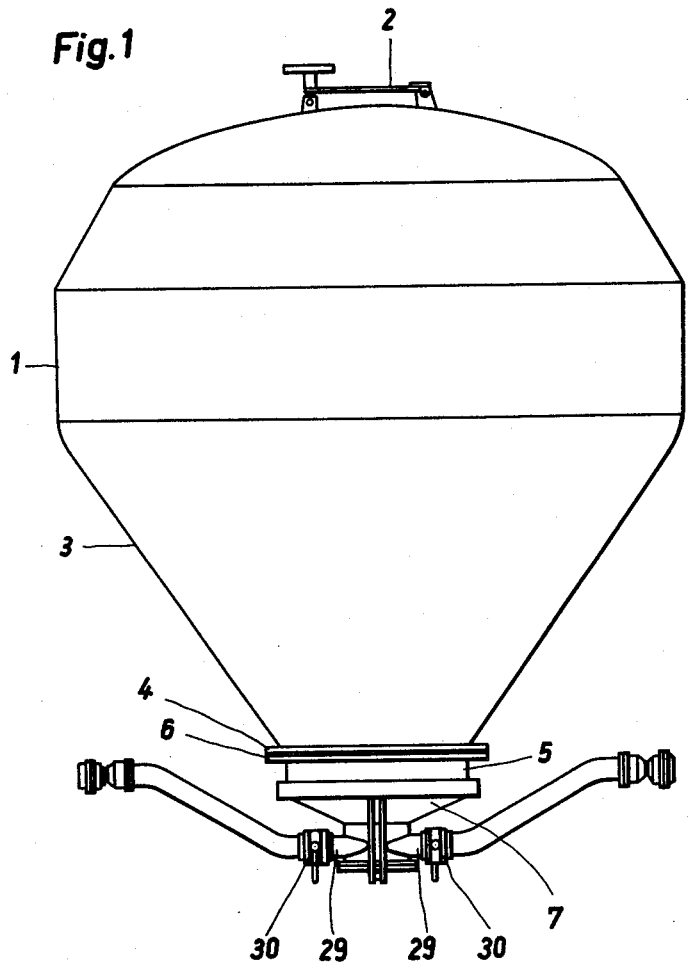

July 28, 1964  W. HERMANNS  3,142,418
TANK FOR POWDERY OR GRANULAR MATERIAL
Filed June 22, 1962  2 Sheets-Sheet 2

Wilhelm Hermanns
Inventor by Mason, Porter, Miller & Stewart
Attorneys

# United States Patent Office 3,142,418
Patented July 28, 1964

3,142,418
TANK FOR POWDERY OR GRANULAR MATERIAL
Wilhelm Hermanns, Frankfurter Strasse 6–14,
Porz-Urbach, Germany
Filed June 22, 1962, Ser. No. 204,496
4 Claims. (Cl. 222—195)

This invention relates to a tank mounted on a vehicle and intended for material in the form of dust, powder or grain, of which the base provided with a central outlet aperture has radially extending ribs inclined slightly to its outlet aperture, hoses which are used as pneumatic emptying elements resting directly by air-permeable walls in the valleys between the ribs, while the crests of the ribs form pointed apices having sides sloping steeply towards the valleys of the ribs.

The object of the invention is to construct tanks of this kind so that they can be used for the most diverse bulk materials, while it is possible for them to be emptied both downwardly and towards the sides of the vehicle, so that they are easy to clean completely.

To this end, the invention proposes primarily that the tank base provided with the aerating hoses for the material in dust form should have a diameter which is only a fraction of the diameter of the substantially cylindrical part of the tank and a funnel-shaped tank part enabling the material to slip down solely under the influence of gravity is disposed between this small-diameter tank base and the cylindrical part of the tank. The said tank base is detachably connected to the bottom end of said funnel-shaped part, and the tank base is provided with a central outlet aperture which merges into a chute which is provided with lateral connections and the bottom of which is provided with a closure flap which can be opened at will.

Depending upon the type of bulk material to be conveyed and delivered, the base fitted with an emptying device to correspond to the material can easily be changed and the aeration hoses disposed in the base can also easily be changed because the base is detachable. By way of the chute adjoining the base outlet openings, the tank can be emptied at will either downwardly or towards the sides of the vehicle, while complete cleaning of the aeration system and hence of the tank is possible through the bottom opening of the chute so that the most diverse bulk materials can be transported successively in the same tank.

The invention also provides that the detachable tank base is constructed in the form of a cylinder and its outside is provided with a ring pipe above the cylinder base inclined slightly towards the central outlet opening, the said ring pipe being fed with compressed air while the air-permeable aeration hoses situated between the base ribs are connected directly to said ring pipe. This means a very simple and hence short and inexpensive air distribution system, this being important particularly when the entire base is changed.

A further feature of the invention is that the delivery connections branching laterally from the outlet chute of the base cylinder merge from an oval cross-section corresponding substantially to the chute diameter, into a round cross-section corresponding approximately to the height of this oval cross-section, so that the chute can be given an inside diameter such that cleaning of the aeration system and hence of the tank can be performed through it.

Finally, the invention proposes that the bottom closure flap of the outlet chute of the base cylinder should comprise a plate which is mounted to be centrally pivotal and which is adapted to be pressed in sealing-relationship against the bottom chute opening, said plate preferably bearing against a seal disposed in a flange at the bottom end of the chute, when the bottom chute aperture is closed.

A circular tank according to the invention is illustrated in the drawing with reference to one exemplified embodiment.

Figure 2:
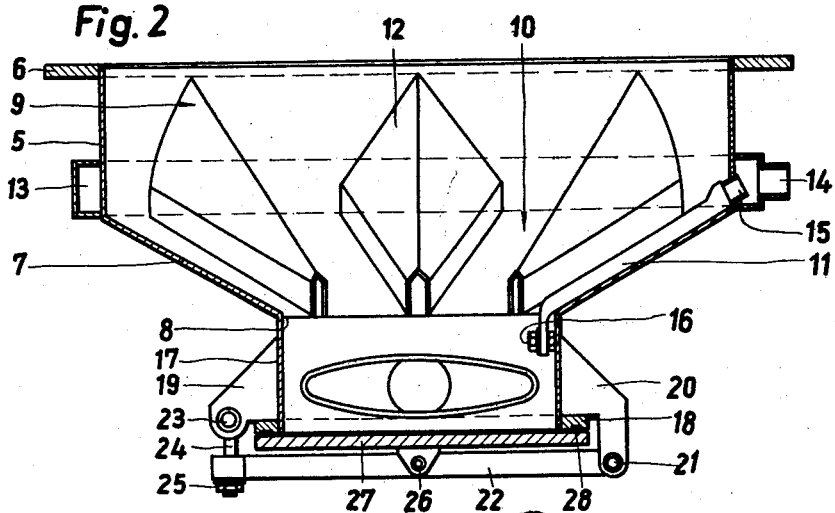
Figure 3:
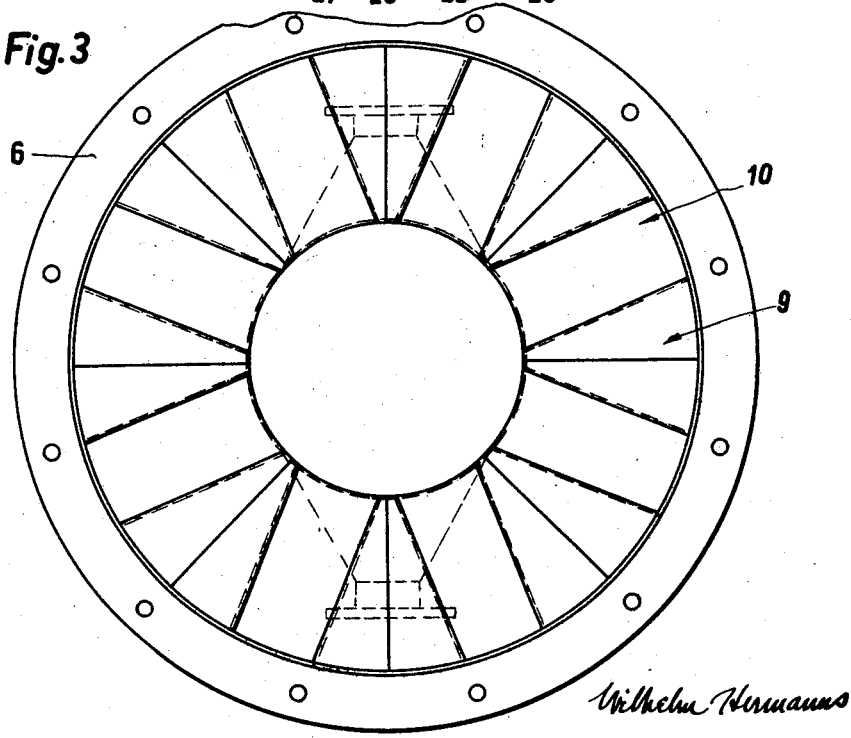

FIG. 1 is a side view of the tank.
FIG. 2 is a vertical section through the bottom part of the tank, and
FIG. 3 is a plan view of the conical base of the tank.

The tank 1, the top end of which is provided with a manhole which serves as a filling aperture and which can be closed by a lid 2, extends conically in its bottom part 3 and is provided with a flange 4 at its bottom open end. The base 5 provided with an aerating system is connected by a flange 6 to said flange 4. The bottom flanges 4 and 6 are bolted together, a seal (not shown) being interposed. The bottom part 5 of the tank is in the form of a cylinder and the bottom thereof 7 has a slight inclination towards the central outlet opening 8. Airtight ribs 9 are fitted to the inclined bottom 7 and between them are left free channels 10 in which are situated textile hoses 11 only one being illustrated which have air-permeable walls and the bottom ends of which are closed. The sides 12 of the ribs 9 slope steeply toward the channels 10.

Above the base 7 which is inclined towards the outlet opening 8, a ring pipe 13 extends around the cylinder 5 and can be fed with compressed air through a connection 14. The vertical wall is apertured inside the ring pipe 13 in the region of the channels 10 and tubular sleeves 15 are hermetically inserted into these apertures, and the top free ends of the air-permeable hoses 11 are shrunk on said sleeves while the bottom ends of said hoses extend into the outlet aperture 8 and are attached there, as shown at 16. Relatively flat metal bars may pass through the hoses 11 to keep the hoses flat.

A downwardly extending chute 17 follows the outlet opening 8 of the inclined portion 7 extending from the cylinder 5 and its bottom end is provided with an outwardly extending flange 18. Above this flange brackets 19 and 20 are welded to the chute 17 on opposite sides. A bowed member 22 is pivotally connected to the bracket 20 at 21 and its free end is forked. A bolt 24 is pivotally connected to the bracket 19 at 23 and is adapted to pivot into the fork of the free end of the bowed member 22 and holds the bowed member 22 in the raised position by means of an adjustable nut 25. A metal plate 27 is mounted pivotally at 26 on the bowed member 22 and bears against a seal 28 provided in the flange 18 of the chute 17. If the bottom opening of the chute 17 is to be opened, the bolt 24 is swung out of the fork of the bowed member 22 after release of the nut 25 so that the bowed member 22 and hence the plate 27 can be swung down about the pivot 21.

Two lateral delivery connections 29 branch from the opposite side walls of the chute 17 and by means of these the bulk material can be blown laterally away from the vehicle when the chute 17 is closed at its bottom end by the plate 27. The said delivery connections have an oval cross-section in the chute 17, the longitudinal axis of the oval being substantially equal to the diameter of the delivery connection, and merge into a circular cross-section substantially equal to the height of the oval. At the free ends of the tubular connections 29 are fitted shut-off valves 30 or the like so that the tubular connections can be opened or closed at will, depending upon which side of the vehicle is to receive the delivery of bulk material. The inside diameter of the chute 17 is made such that the cylinder 5 can be cleaned from the underside of the chute.

I claim:
1. In combination with a transport vessel for powdery, mealy and granular material, a conical bottom having radially disposed downwardly sloping ribs with alternate channels, an air-permeable hose in each channel, a connection connecting each hose to a source of air under pressure, a chute leading downwardly from the bottom, diametrically disposed horizontal pneumatic delivery pipes in the chute, and a removable closure for the bottom of the chute.

2. In combination with a transport vessel for powdery, mealy and granular material, a conical bottom having radially disposed downwardly sloping ribs with alternate channels, an air-permeable hose in each channel, a connection connecting each hose to a source of air under pressure, a chute leading downwardly from the bottom, diametrically disposed horizontal pneumatic delivery pipes leading from the chute, each pipe having a flaring oval inlet section substantially extending over the greater part of the diameter of the chute.

3. In combination with a transport vessel for powdery, mealy and granular material, a cylindrical bottom section for the vessel, a compressed air pipe around the section, a conical bottom section, leading from the said cylindrical section, radially disposed ribs sloping downwardly through both sections, an air-permeable hose in the channel between each pair of adjacent ribs, connections between said hose and the air pipe, and discharge means from the conical bottom section.

4. In combination with a transport vessel for powdery, mealy and granular material, a conical bottom having radially disposed downwardly sloping ribs with alternate channels, an air-permeable hose in each channel, a connection connecting each hose to a source of air under pressure, a chute leading downwardly from the bottom, diametrically disposed horizontal pneumatic delivery pipes in the chute, and means for discharging by gravity from the bottom, material too heavy for pneumatic delivery.

References Cited in the file of this patent
UNITED STATES PATENTS

| | | |
|---|---|---|
| 1,746,395 | Herdemerten | Feb. 11, 1930 |
| 2,594,072 | Ridley | Apr. 22, 1952 |
| 2,828,163 | Allen et al. | Mar. 25, 1958 |
| 3,009,607 | Sayre | Nov. 21, 1961 |